United States Patent Office 2,874,022
Patented Feb. 17, 1959

2,874,022

COMPOSITION AND PROCESS FOR APPLICATION AND DISCHARGE PRINTING

Fritz Raff, Maywood, N. J., Robert Terrence McGuire, Flushing, N. Y., and Richard Joseph Palestri, Clifton, N. J., assignors to Ciba Company, Inc., New York, N. Y., a corporation of New York No Drawing. Application June 14, 1956
Serial No. 591,292

11 Claims. (Cl. 8—64)

The present invention relates to application and discharge printing of textile fabrics, more particularly fabrics constructed of cellulose acetate, and to compositions of matter suitable for such application and discharge printing.

Two main processes are known at present for application and discharge printing with vat colors on acetate fabrics, namely, the (1) zinc formaldehyde sulfoxylate method (acid medium) and (2) the sodium formaldehyde sulfoxylate method (alkaline medium).

I. METHOD WITH ZINC FORMALDEHYDE SULFOXYLATE

The stability of the print pastes employed in this method is poor but can be improved by additions of formaldehyde. When working in an acid reduction medium, the vat dyestuff is reduced to its free leuco-acid state. This form has only limited solubility and prints made by this method exhibit poor color yield and the reoxidation is difficult. Accordingly, the range of suitable vat dyestuffs is restricted.

Improvements on formulations containing zinc formaldehyde sulfoxylate are based on additions of swelling agents, such as inorganic salts of sulphocyanuric acid (ammonium, sodium and other thiocyanates) and salicylic acid or its sodium salt, often in conjunction with agents promoting wetting and penetrating, such as glycol derivatives, which aid fixation.

II. METHOD WITH SODIUM FORMALDEHYDE SULFOXYLATE

Normal alkaline printing pastes cause undesirable saponification of cellulose acetate, spreading out of the pronts or halo formation, or flushing of the prints. Furthermore, due to the fact that sodium formaldehyde sulfoxylate is not soluble in cellulose acetate, its effectiveness depends on certain additions to the print past which promote transfer to this fiber.

Color yield is better when printing from an alkaline medium, because partial saponification of cellulose acetate permits increased fixation of vat colors. However, this method is not reliable because of the excessive flushing, halo formation and erratic development.

Improvements on formulations containing sodium formaldehyde sulfoxylate in a strong alkaline medium (e. g. alkali carbonates) are based on:

(a) Additions of swelling agents for cellulose acetate, such as inorganic salts of sulphocyanuric acid (sodium, calcium and zinc thiocyanates) or salicylic acid and its salts.

(b) Additions of agents which promote wetting and penetrating, such as glycol derivatives.

(c) Additions of anthraquinone or hydroquinone as reduction catalysts.

(d) Additions of solids to the print paste in the form of pigments, such as zinc oxide, titanium dioxide, magnesium oxide, etc., to avoid flushing and halo formation.

(e) Preparation of cellulose acetate fabrics by padding through a solution of thiodiethylene glycol and drying before printing.

While these additions or preparations, either alone or in combination improve the results, they are, nevertheless, still unreliable.

We have found that the disadvantages of the heretofore known application and discharge printing procedures and compositions can be overcome by employing a white or vat color discharge paste which comprises sodium formaldehyde sulfoxylate, a non-jelling unconverted starch, and a thiourea. The composition is also advantageously affected by the inclusion of a solvent which facilitates penetration into the textile material, for example, glycols and their derivatives, e. g., ethylene glycol, diethylene glycol, triethylene glycol, monomethyl and monoethyl ether of ethylene glycol, and especially thiodiethylene glycol. A textile gum thickener is also employed in the composition to provide the necessary consistency to the printing paste. Such thickeners are, for example, gum karaya, gum arabic, gum tragacanth, British gum and the like.

An organic base which does not cause saponification of the cellulose acetate is advantageously employed with a discharge paste prepared as above, which contains a vat color for color discharging. By the use of an organic base, saponification of the cellulose acetate is eliminated, while on the other hand, reduction of the dye to the leuco form is facilitated. Examples of such bases are organic amines, e. g., alkanolamines, such as the methanol- and ethanolamines, more particularly, mono-, di- and trimethanol- and ethanolamines; cyclohexylamine, tetraethanolammonium hydroxide, phenyldiethanolamine, and the like. Triethanolamine is especially effective as the organic base. The presence of the organic base is not required where a white discharge paste is employed.

Examples of thioureas are thiourea, mono- and diaryl thioureas, such as mono- and diphenyl thiourea and the like. Especially effective is thiourea. The thioureas facilitate the dye discharge and assist color fixation.

By employing in the composition a dry non-jelling, un-converted (non-hydrolyzed) starch, such as sago, tapioca, and especially the starch obtained from waxy maize, it has been found that flushing and halo formation is eliminated in the discharge printing of cellulose acetate textile materials.

It has also been found that by replacing part of the above-mentioned textile gum thickener by an emulsion thickener, any tendency of the colors to mark off during the drying operation after printing, because of creasing of the printed cloth, can be eliminated. An emulsion thickener found highly suitable for this purpose can be made up of (a) an aliphatic hydrocarbon solvent of a relatively high boiling range, (b) a non-ionic emulsifier, (c) and water. As the aliphatic hydrocarbon solvent, there can be employed white mineral spirits or "Varsol No. 2" which is an aliphatic petroleum solvent mixture with a boiling range of 315–390° F. Any suitable nonionic emulsifier may be employed, as, for example, the product sold under the name of "Ultravon JF 100%" which chemically is an alkyl polyether, more particularly a polyethylene ether. It was also found that the inclusion of this emulsion thickener further increases the color yield and results in a more stable printing paste. The range of components (a), (b) and (c) in the emulsion thickener can vary as follows:

(a) 45 to 75 parts by volume
(b) 5 to 8 parts by weight
(c) 50 to 17 parts

A preferred emulsion is made up by first dissolving 7.5 parts of "Ultravon JF 100%" in 27.5 parts of water and then adding 65 parts of "Varsol No. 2" with high speed mixing to form the emulsion.

The concentrations of the various components comprising the novel discharge compositions may be varied. For example, suitable compositions may be made up in which the components vary in the ranges set forth below:

|  | Parts |
|---|---|
| Crystal gum (textile gum thickener) | 10 to 50 |
| Thiodiethylene glycol | 3 to 10 |
| Non-saponifying organic base | 0 to 15 |
| Sodium formaldehyde sulfoxylate | 5 to 25 |
| Emulsion thickener | 0 to 15 |
| Non-jelling unconverted starch | 5 to 20 |
| Thiourea | 5 to 10 |
| Anthraquinone (30% paste) | 0 to 1 |

For producing white discharges the preparation is used without the addition of a color, and no organic base need be present. For producing a color discharge, or for application printing, any suitable vat dye for cellulose acetate can be employed.

The novel compositions can be applied in the conventional and well known manner employed for application and discharge printing, either by roller printing or screen printing. In general, where it is applied for discharge printing, a paste is formed in the usual manner from the components, and it is then printed upon the fabric which is dyed with a dischargeable dye, such as any dispersed acetate dyestuff which is dischargeable, and the printed fabric subjected to the action of steam, whereupon discharging takes place. For color discharging, a vat dyestuff in paste form suitable for printing is included, and a step of reoxidizing the reduced dye is included after the steaming. In general, the printed material is air dried at temperatures not exceeding about 70° C.

The following examples will serve to illustrate the manner of practicing our invention. The parts are by weight.

*Example 1*

Seven white printing pastes were made as follows:

| Pastes | 1 | 2 | 3 | 4 | 5 | 6 | 7 |
|---|---|---|---|---|---|---|---|
| Crystal gum (25% karaya gum solution pastes 1-4; 30% solution pastes 5-7) | 45 | 40 | 40 | 45 | 20 | 10 | 18 |
| Thiodiethylene glycol | 4 | 4 | 4 | 4 | 6 | 8 | 6 |
| Triethanolamine | 10 | 10 | 10 | 10 |  |  | 10 |
| Sodium formaldehyde sulfoxylate | 10 | 10 | 10 | 10 | 25 | 25 | 20 |
| Emulsion thickener |  |  |  |  |  | 15 | 12 |
| Unconverted waxy maize starch | 15 | 15 | 20 | 15 | 10 | 8 | 8 |
| Thiourea | 5 | 5 | 10 | 10 | 10 | 10 | 10 |
| Water | 11 | 15 | 6 | 6 | 29 | 24 | 16 |
| Anthraquinone 30% paste |  | 1 |  |  |  |  |  |
| Total, parts by weight | 100 | 100 | 100 | 100 | 100 | 100 | 100 |

(a) A 100 percent cellulose acetate crepe material was dyed a wine shade with 1.4 percent of Cibacete Rubine 3BS (Ciba Company, Inc.) based on the weight of the goods, in the customary single bath method of dyeing.

A color discharge paste was prepared from 95 parts of white paste 1 and 5 parts of Midland Vat Blue RG double paste (Colour Index 1183) and this was applied by screen printing. The fabric was dried, aged for 5-8 minutes in saturated steam at 212° F., reoxidized at 100° F. in a solution of 2 percent hydrogen peroxide (30 percent by volume) and 2 percent acetic acid (56 percent), rinsed well in water at 100° F., soaped at 100° F., rinsed and dried at about 70° C. Clear and sharp blue prints on the wine colored ground were obtained.

When the paste was applied to undyed cellulose acetate, equally clear and sharp blue colored prints on an undyed ground were obtained.

When the white discharge paste was used alone without the added vat color a clear sharp white discharge was obtained on the wine colored ground.

(b) A 100 percent cellulose acetate crepe fabric was dyed a medium blue shade with 1.2% of Cibacete Blue 3GN (Ciba Company, Inc.) based on the weight of material, in the customary single bath method of dyeing.

A color discharge paste was prepared from 95 parts of white paste 2 and 5 parts of dibenzopyrene-1,6-quinone and this was applied to and the fabric was then treated in the same manner as described under (a) above. There was obtained a sharp canary yellow print on the light blue ground.

(c) A 100 percent cellulose acetate crepe fabric was dyed yellow with 1.8 percent of Cibacete Yellow 5GN (Ciba Company, Inc.) based on the weight of the material in the customary single bath method of dyeing.

A color discharge paste was prepared from 95 parts of white paste 3 and 5 parts of Cibanone Brilliant Green BF double paste (C. I. 1101) and this was applied to and the fabric was then treated in the same manner as described under (a) above. There was obtained a sharp green print on the yellow ground.

(d) A color discharge paste was prepared from 95 parts of white paste 4 and 5 parts of Ciba Pink B double paste (C. I. 1207). When this was printed on the blue dyed fabric described under (b) and then treated as described a sharp clear pink print on a blue ground was obtained.

Similar color discharge pastes were prepared with the above white pastes employing the following vat dyes to obtain the corresponding colored application and discharge prints:

Ciba Orange R paste (C. I. 1217)
Ciba Blue 2BDG double paste (C. I. 1184)
Cibanone Violet 4R double paste (C. I. 1104)
Cibanone Navy Blue RA double paste (C. I. 1100)

(e) A 100 percent cellulose acetate crepe material was dyed a red shade with 1 percent Cibacete Red YNB Ex. Conc. (Ciba Company, Inc.) based on the weight of the goods, in the customary single bath method.

A white discharge paste was prepared according to white paste 5 and this was applied by machine printing. The fabric was dried at 160° F., aged for 8 minutes in saturated steam at 212° F., rinsed in water at 100° F., soaped at 100° F., rinsed and dried. A sharp pure white print on the red colored ground was obtained.

(f) A white discharge paste was prepared according to white paste 6. When this was machine printed on the wine dyed fabric described under (a) and the goods processed as described under (e), a sharp pure white on the wine colored ground was obtained.

(g) A color discharge paste was prepared from 90 parts of white paste 7 and 10 parts of 6-ethoxy-4'-methyl-6'-chloro-thioindigo. When this was machine printed on the blue dyed fabric described under (b) and then treated as described under (a) a sharp bright scarlet print on a blue ground was obtained.

The novel discharge compositions, it has been found, are effective in discharging to a clear white, cellulose acetate dyestuffs which are not dischargeable to a white by the conventional methods, such as, for example, Cibacete Yellow GBA extra and Cibacete Yellow RLN.

While the novel discharge compositions possess special advantages with respect to printing cellulose ester materials, such as cellulose di- and triacetates, it is to be understood that they may also be employed on cellulosic or non-cellulosic textile materials, such as cotton, rayon, silk, nylon and the like.

By our novel method and compositions good fixation of vat colors in application and discharge printing on cellulose acetate without saponification is effected; flushing and halo formation is eliminated; marking off is prevented and discharge effects and color fixation are improved. An alkaline sulfoxylate discharge medium is provided which does not cause saponification. The pH range of the print pastes containing the organic base is approximately between pH 9 and 11, whereas the print pastes free from the organic base have a pH from approximately neutral to about 8.

This application is a continuation-in-part of our application Serial No. 517,362, filed June 22, 1955, now abandoned.

What is claimed is:

1. A composition of matter for discharge printing comprising sodium formaldehyde sulfoxylate, a non-jelling unconverted starch, a thiourea selected from the group consisting of thiourea, monophenyl thiourea, and diphenyl thiourea, and a solvent which facilitates penetration.

2. A composition of matter for discharge and application printing comprising sodium formaldehyde sulfoxylate, an alkaline organic base which does not cause saponification of cellulose acetate, a non-jelling unconverted starch, a thiourea selected from the group consisting of thiourea, monophenyl thiourea, and diphenyl thiourea, and a solvent which facilitates penetration.

3. A composition of matter in accordance with claim 2, which includes a vat dyestuff.

4. A composition of matter for discharge and application printing which comprises sodium formaldehyde sulfoxylate, an alkaline organic base which does not cause saponification of cellulose acetate, a textile gum thickener, thiodiethylene glycol, a non-jelling unconverted starch and thiourea.

5. A composition in accordance with claim 4, in which part of the textile gum thickener is replaced by an emulsion of a hydrocarbon aliphatic solvent and a non-ionic emulsifier, said aliphatic hydrocarbon solvent having a boiling range of about 315° F. to 390° F.

6. A composition of matter for discharge and application printing which comprises sodium formaldehyde sulfoxylate, a textile gum thickener, thiodiethylene glycol, triethanolamine, a dry non-jelling unconverted starch and thiourea.

7. A composition of matter in accordance with claim 6, which includes a vat dyestuff.

8. A composition of matter for discharge and application printing comprising sodium formaldehyde sulfoxylate, a non-jelling unconverted starch, a thiourea selected from the group consisting of thiourea, monophenyl thiourea, and diphenyl thiourea, and an emulsion of a hydrocarbon aliphatic solvent and a non-ionic emulsifier, said aliphatic hydrocarbon solvent having a boiling range of about 315° F. to 390° F.

9. A process for application and discharge printing of cellulose acetate which comprises locally applying to the fabric the composition described in claim 2, and steaming the fabric.

10. A process for application and discharge printing of cellulose acetate which comprises locally applying to the fabric the composition described in claim 6, and steaming the fabric.

11. A process for discharge printing of textile materials comprising a cellulose acetate, which comprises printing the textile material colored with a dischargeable dye with a paste comprising sodium formaldehyde sulfoxylate, an alkaline organic base which does not cause saponification of cellulose acetate, a non-jelling unconverted starch, a thiourea selected from the group consisting of thiourea, monophenyl thiourea and diphenyl thiourea, and a solvent which facilitates penetration, and steaming and oxidizing the printed fabric, whereby discharge prints free from halo formation and free from saponification of the textile material are obtained.

References Cited in the file of this patent
UNITED STATES PATENTS

| | | |
|---|---|---|
| 1,792,152 | Ellis | Feb. 10, 1931 |
| 2,574,806 | Wiazmitinow | Nov. 15, 1951 |
| 2,619,403 | Krause | Mar. 25, 1952 |
| 2,686,707 | Olpin | Aug. 17, 1954 |
| 2,698,218 | Sutton | Dec. 28, 1954 |

OTHER REFERENCES

"The Principles and Practice of Textile Printing," by Knecht and Fothergill, 4th ed., 1952, pub. London by Chas. Griffin and Co., pp. 130–133.